United States Patent
Haight

(10) Patent No.: US 10,406,972 B2
(45) Date of Patent: Sep. 10, 2019

(54) VEHICLE TECHNOLOGIES FOR AUTOMATED TURN SIGNALING

(71) Applicant: Tesla, Inc., Palo Alto, CA (US)

(72) Inventor: Sean Haight, Newark, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 15/896,581

(22) Filed: Feb. 14, 2018

(65) Prior Publication Data

US 2018/0244195 A1  Aug. 30, 2018

Related U.S. Application Data

(60) Provisional application No. 62/463,383, filed on Feb. 24, 2017.

(51) Int. Cl.

| | |
|---|---|
| B60Q 1/34 | (2006.01) |
| B60Q 1/00 | (2006.01) |
| G06K 9/00 | (2006.01) |
| B60R 11/04 | (2006.01) |
| G01S 13/86 | (2006.01) |
| G01S 13/93 | (2006.01) |
| G08G 1/16 | (2006.01) |

(52) U.S. Cl.
CPC ............ *B60Q 1/346* (2013.01); *B60Q 1/0023* (2013.01); *B60R 11/04* (2013.01); *G01S 13/862* (2013.01); *G01S 13/867* (2013.01); *G01S 13/931* (2013.01); *G06K 9/00791* (2013.01); *G06K 9/00798* (2013.01); *G01S 2013/936* (2013.01); *G01S 2013/9353* (2013.01); *G01S 2013/9367* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 6,768,933 B2 * | 7/2004 | Serezat | B60Q 1/346 340/475 |
| 6,878,399 B2 | 4/2005 | Chabrecek et al. | |
| 6,975,218 B2 | 12/2005 | Madau | |
| 7,986,223 B2 | 7/2011 | Au et al. | |

(Continued)

FOREIGN PATENT DOCUMENTS

DE    10 2013 001120 A1    7/2014

OTHER PUBLICATIONS

PCT International Search Report and The Written Opinion dated May 18, 2018 in related PCT Application No. PCT/US2018/019122.

(Continued)

*Primary Examiner* — Joseph H Feild
*Assistant Examiner* — John F Mortell
(74) *Attorney, Agent, or Firm* — Dentons US LLP

(57) ABSTRACT

This disclosure discloses various vehicle technologies for automatically activating a turn signal when a vehicle is turning or changing lanes based on analysis of data, which can include data from an image capture device, radar, a steering angle sensor, and a ultrasonic sensor. This disclosure also contemplates that a decision to automatically activate a turn signal in a vehicle that is turning or changing lanes may take into account whether other vehicles or pedestrians are in vicinity thereof and whether those other vehicles or pedestrians would benefit from the turn signal being activated.

21 Claims, 12 Drawing Sheets

(56) References Cited

U.S. PATENT DOCUMENTS

| | | | |
|---|---|---|---|
| 9,020,755 B1 | 4/2015 | Gazit et al. | |
| 2003/0004643 A1 | 1/2003 | Serezat | |
| 2003/0025597 A1* | 2/2003 | Schofield | B60Q 1/346 |
| | | | 340/435 |
| 2004/0100373 A1 | 5/2004 | Ponziani | |
| 2004/0143381 A1 | 7/2004 | Regensburger et al. | |
| 2005/0162266 A1 | 7/2005 | Mills | |
| 2005/0200467 A1 | 9/2005 | Au et al. | |
| 2011/0199200 A1 | 8/2011 | Lueke et al. | |
| 2011/0285586 A1 | 11/2011 | Ferguson | |
| 2014/0309855 A1 | 10/2014 | Tran | |
| 2015/0274062 A1* | 10/2015 | Wen | B60K 31/18 |
| | | | 348/77 |
| 2016/0238404 A1* | 8/2016 | Okada | G01C 21/3658 |
| 2016/0291164 A1 | 10/2016 | Jordan | |
| 2018/0053419 A1* | 2/2018 | Kiefer | H04L 67/12 |

OTHER PUBLICATIONS

PCT Written Opinion and International Search Report issued in co-pending PCT/US2018/026210 dated Jun. 21, 2018.

* cited by examiner

US 10,406,972 B2

VEHICLE TECHNOLOGIES FOR AUTOMATED TURN SIGNALING

CROSS-REFERENCE TO RELATED APPLICATION

This application claims priority to U.S. patent application Ser. No. 62/463,383 filed on Feb. 24, 2017 and all the benefits accruing therefrom under 35 U.S.C. § 119, the contents of which are incorporated by reference in their entirety.

TECHNICAL FIELD

This disclosure relates to automated turn signal activation in vehicles.

BACKGROUND

A vehicle, such as a car, hosts a turn signal light source, such as a bulb, which is manually activated by a driver of the vehicle, such as when making a turn or switching lanes. When activated, the turn signal light source visually notifies others, such pedestrians and the drivers of other vehicles, that the vehicle may change its direction of travel by, for example, turning onto another road or switching road lanes. However, since the turn signal light source is manually activated by the driver, there are often times when the driver neglects to activate the turn signal light source before changing its direction of travel. This situation can be dangerous, especially on high speed roads, and is often a cause of vehicle accidents or instances of road rage.

Although various technologies exist in order to mitigate the failure of a driver to engage the vehicle's turn signal, these technologies are inadequate for various technical reasons, such as false positives and slow reaction time. For example, some prior attempts to ameliorate this situation have included smart turn signals that stay silent and in the background, but present a warning to the driver if the vehicle is steered outside the bounds of a lane, and turn signal assist programs that generate dashboard messages to remind a driver to use turn signals after repeated failures to do so. These existing technologies still rely on the driver of the vehicle to manually engage the turn signal light source when appropriate.

SUMMARY

This disclosure discloses one or more inventions providing for automated signaling of actual or imminent turning or leaving of its current lane by a vehicle. The leaving can be either a crossing of a lane line into an adjacent lane, the turning of the vehicle onto a path that crosses the current lane, or otherwise veering out of a lane (e.g., turning onto an off-ramp).

Typical vehicular laws require a vehicle to signal such leaving of a lane with a light as seen in the typical flashing light turn signals found in most cars and trucks. Most vehicles have turn signal lamps at the rear of the vehicle. Some vehicles have additional turn signal lamps at a forward position of the vehicle, such as, e.g., on side view mirrors. However, with advent of vehicle-to-vehicle communications, it also becomes possible for a vehicle to provide a telemetric communication informing other vehicles when leaving a lane or making a turn.

An embodiment includes a method of automatically activating a turn signal source in a vehicle, the method comprising: determining, via a processor, that a first vehicle is going to turn or leave a lane based on data from a first data source of the first vehicle; determining, via the processor, that a driver of the first vehicle is applying a steering action to the first vehicle based on data from a second data source of the first vehicle; determining, via the processor, an approximate location of a second vehicle relative to the first vehicle based on data from a third data source of the first vehicle and data from a fourth data source of the first vehicle; activating, via the processor, a turn signal source of the first vehicle.

In an embodiment, the turn signal source is a turn signal lamp voltage source.

In an embodiment, the turn signal source is a transmitter that transmits a telemetric signal informing others of the turn.

An embodiment includes a method of automated turn signaling, the method comprising: determining, via the processor, that a vehicle will cross a lane line or turn based on a measured steering angle value that is within a value range stored in a memory, wherein the vehicle includes the processor, the memory, and the turn signal source; and activating, via the processor, the turn signal source based on the determination that a vehicle will cross a lane line or turn.

An embodiment includes a storage device having stored therein a set of processor executable instructions which, when executed by an electronic processing system, cause the electronic processing system to: determine a path of travel of a first vehicle relative to a lane line based on a first set of data received from an image capture device of the first vehicle; determine that a second vehicle is present within a predetermined distance from the first vehicle based on a second set of data received from a reflective wave detector; activate a turn signal source of the first vehicle when (a) the first vehicle has a travel path and a steering angle such that the first vehicle will cross the lane line or effect a turn, and (b) the second vehicle is present within the predetermined distance from the first vehicle.

An embodiment includes an apparatus for automatic turn signal source activation, the apparatus comprising: a vehicle including a processor, a camera, a steering angle sensor, and a turn signal source, wherein the processor is programmed to determine when the vehicle is going to turn or leave a lane based on data from at least one of the camera or the steering angle sensor, wherein the processor is programmed to activate the turn signal source when the processor determines that the vehicle is going to turn or leave the lane.

An embodiment includes an apparatus for automatic turn signal source activation, the apparatus comprising: a first vehicle including a processor, a camera, a steering angle sensor, one or more ultrasonic sensors, a radar, and a turn signal source, wherein the processor is programmed to determine when the first vehicle is going to turn or leave a lane based on data from at least one of the camera or the steering angle sensor, wherein the processor is programmed to determine an approximate location of a second vehicle relative to the first vehicle based on data from at least one of the ultrasonic sensor or the radar, wherein the processor is programmed to activate the turn signal source when the processor determines that the first vehicle is going to turn or leave the lane in proximity of the second vehicle.

An embodiment includes an apparatus for automatic turn signal activation, the apparatus comprising: a vehicle including a processor, a memory, a steering angle sensor, and a turn signal source, wherein the memory stores a value range of steering angles, wherein the steering angle sensor is configured to output a steering angle value when the vehicle is in motion, wherein the processor is programmed to determine that the vehicle will leave a lane line or effect a turn when the steering angle value is within the value range stored in memory, wherein the processor is programmed to activate the turn signal source based on the determination that the vehicle will leave a lane line or effect a turn.

These and other embodiments and/or aspects of the invention(s) are discussed in greater detail below with reference to the accompanying drawings.

DETAILED DESCRIPTION

Generally, this disclosure discloses a technology for automatically activating a turn signal source of a first vehicle when the first vehicle will imminently leave its current lane by either crossing over a lane line or effecting a turn with or without a second vehicle being in proximity of the first vehicle or with or without a bystander being in proximity of the first vehicle. For example, such proximity can be within 20 feet of the first vehicle, within 40 feet of the first vehicle, within 60 feet of the first vehicle, or other distances from the first vehicle. This automatic activation may occur when the first vehicle processes a plurality of data from a plurality of devices on the first vehicle to determine a trajectory of the first vehicle and to determine whether the first vehicle will cross the lane line or effect a turn without manual signal activation. If it is computationally determined that the first vehicle is leaving a lane or making a turn, then the first vehicle will activate its turn signal source.

Alternatively, the automatic activation may occur when the first vehicle processes a plurality of data from a plurality of devices on the first vehicle to determine a trajectory of the first vehicle and to determine whether the first vehicle will cross the lane line or effect a turn without manual signal activation. Further, the first vehicle processes the data to determine if there are one or more surrounding objects/vehicles that would benefit from this automatic activation. If so, then the turn signal source will be activated.

Figure 1:
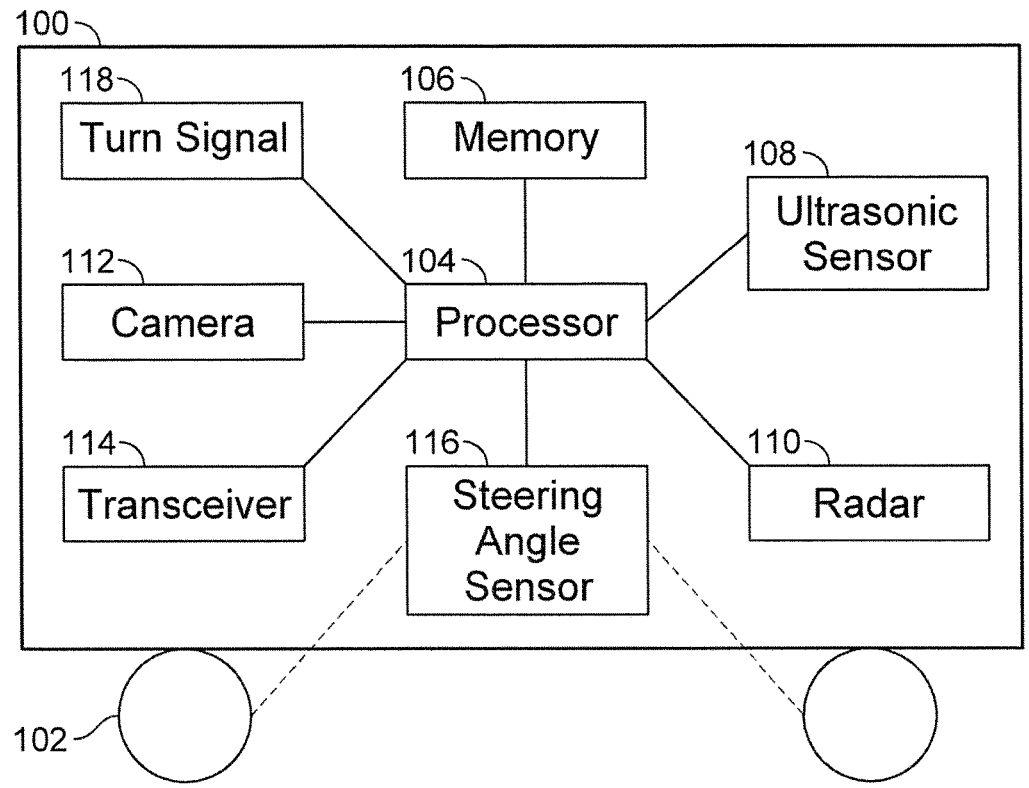
FIG. 1 shows a schematic diagram of an exemplary embodiment of a vehicle according to this disclosure.

FIG. 1 shows a schematic diagram of an exemplary embodiment of a vehicle according to this disclosure. A vehicle 100 includes (at least one of each) a chassis, a power source, a drive source, a set of wheels 102, a processor 104, a memory 106, an ultrasonic sensor 108, a radar 110, a camera 112, a transceiver 114, a steering angle sensor 116, and a turn signal source 118. The vehicle 100 can be a land vehicle, whether manned or unmanned, whether non-autonomous, semi-autonomous, or fully autonomous, such as a car/automobile, a sports utility vehicle (SUV), a van, a minivan, a limousine, a bus, a truck, a trailer, a tank, a tractor, a motorcycle, a bicycle, a heavy equipment vehicle, or others. Note that the vehicle 100 can be front wheel driven, rear wheel driven, four wheel driven, or all wheel driven. Turning can be effected via the front wheels, the rear wheels, or both, for vehicles with wheels. Tracked vehicles effect turns by means of differential driving of the tracks. For example, the vehicle 100 can be a Tesla Corporation Model S ® (or any other Tesla Corporation model) equipped with Tesla Autopilot (enhanced Autopilot) driver assist functionality and having a Hardware 2 component set (November 2016). In some embodiments, the vehicle may be equipped with a forward looking infrared camera (FLIR), which may communicate with the processor 104, as well.

The chassis securely hosts the power source, the drive source, and the set of wheels 102. The power source includes a battery, which is preferably rechargeable. The drive source preferably includes an electric motor, whether brushed or brushless. However, an internal combustion engine is contemplated within the scope of the invention, in which case the power source includes a fuel tank hosted via the chassis and coupled to the internal combustion engine. The power source is coupled to the drive source such that the drive source powered thereby. The set of wheels 102 includes at least one wheel, which may include an inflatable tire, which may include a run-flat tire. The set of wheels 102 is driven via the drive source.

The processor 104 is a hardware processor, such as a single core or a multicore processor. For example, the processor 104 comprises a central processing unit (CPU), which can comprise a plurality of cores for parallel/concurrent independent processing. In some embodiments, the processor 104 includes a graphics processing unit (GPU). The processor 104 is powered via the power source and is coupled to the chassis.

The memory 106 is in communication with the processor 102, such as in any known wired, wireless, or waveguide manner. The memory 106 comprises a computer-readable storage medium, which can be non-transitory. The storage medium stores a plurality of computer-readable instructions for execution via the processor 104. The instructions instruct the processor 104 to facilitate performance of a method for automated turn signal activation, as disclosed herein. For example, the instructions can include an operating system of the vehicle or an application to run on the operating system of the vehicle. For example, the processor 104 and the memory 106 can enable various file or data input/output operations, whether synchronous or asynchronous, including any of the following: reading, writing, editing, modifying, deleting, updating, searching, selecting, merging, sorting, encrypting, de-duplicating, or others. The memory 106 can comprise at least one of a volatile memory unit, such as random access memory (RAM) unit, or a non-volatile memory unit, such as an electrically addressed memory unit or a mechanically addressed memory unit. For example, the electrically addressed memory comprises a flash memory unit. For example, the mechanically addressed memory unit comprises a hard disk drive. The memory 106 can comprise a storage medium, such as at least one of a data repository, a data mart, or a data store. For example, the storage medium can comprise a database, including distributed, such as a relational database, a non-relational database, an in-memory database, or other suitable databases, which can store data and allow access to such data via a storage controller, whether directly and/or indirectly, whether in a raw state, a formatted state, an organized stated, or any other accessible state. The memory 106 can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium. The memory 106 is powered via the power source and is coupled to the chassis.

The ultrasonic sensor 108 is in communication with the processor 104, such as in any known wired, wireless, or waveguide manner. The ultrasonic sensor 108 includes a transducer which converts an electrical signal to an ultrasound wave for output, such as via a transmitter or a transceiver, and which converts a reflected ultrasound wave into an electrical signal for input, such as via a receiver or a transceiver. The ultrasonic sensor 108 evaluates an attribute of a target via interpreting a sound echo from the sound wave reflected from the target. Such interpretation may include measuring a time interval between sending the sound wave and receiving the echo to determine a distance to the target. The ultrasonic sensor 108 is preferably powered via the power source and coupled to the chassis. In a preferred embodiment, there are multiple ultrasonic sensors 108.

The radar 110 is in communication with the processor 104, such as in any known wired, wireless, or waveguide manner. The radar 110 includes a transmitter producing an electromagnetic wave such as in a radio or microwave spectrum, a transmitting antenna, a receiving antenna, a receiver, and a processor (which may be the same as the processor 104) to determine a property of a target. The same antenna may be used for transmitting and receiving as is common in the art. The transmitter antenna radiates a radio wave (pulsed or continuous) from the transmitter to reflect off the target and return to the receiver via the receiving antenna, giving information to the processor about the target's location, speed, angle, and other characteristics. The processor may be programmed to apply digital signal processing (DSP), machine learning and other relevant techniques, such as via using code stored in the memory 106, that are capable of extracting useful information from various noise levels. In some embodiments, the radar 110 includes lidar, which employs ultraviolet, visible, or near infrared light from lasers in addition to, or as an alternative to, the radio wave. The radar 110 is preferably powered via the power source and coupled to the chassis.

The camera 112 is in communication with the processor 104, such as in any known wired, wireless, or waveguide manner. The camera 112 includes an image capture device or optical instrument for capturing or recording images, which may be stored locally, whether temporarily or permanently, transmitted to another location, or both. The camera 112 may capture images to enable the processor 104 to perform various image processing techniques, such as compression, image and video analysis, telemetry, or others. For example, image and video analysis can comprise object recognition, object tracking, any known computer vision or machine vision analytics, or other analysis. The images may be individual still photographs or sequences of images constituting videos. The camera 112 can comprise an image sensor, such as a semiconductor charge-coupled device (CCD) or an active pixel sensor in a complementary metal-oxide-semiconductor (CMOS) or an N-type metal-oxide-semiconductor (NMOS), and a lens, such a rectilinear lens, a concave lens, a convex lens, a wide-angle lens, a fish-eye lens, or any other lens. The camera 112 can be analog or digital. The camera 112 can comprise any focal length, such as wide angle or standard. The camera 112 can comprise a flash illumination output device. The camera 112 can comprise an infrared illumination output device. The camera 112 is preferably powered via the power source and coupled to the chassis.

The transceiver 114 is in communication with the processor, such as in any known wired, wireless, or waveguide manner. The transceiver 114 includes a transmitter and a receiver configured for wireless network communication, such as over a satellite network, a vehicle-to-vehicle (V2V) network, a cellular network, or any other wireless network such as to receive an update, such as over-the-air, to the set of instructions stored in the memory 106. The transceiver 114 is preferably powered via the power source and coupled to the chassis. The transceiver 114 can also enable Global Positioning System (GPS) geolocation identification (or other geolocating system). Vehicle 100 may contain multiple transceivers that configured for wireless communication on one the same or different networks. For example, when the vehicle 100 includes a plurality of transceivers 114, some of the transceivers can operate on cellular networks and others on satellite networks. Further, transceiver 114 may communicate with a transceiver of another vehicle over a Vehicular Ad Hoc Networks (VANET).

The steering angle sensor 116 is in communication with the processor 104, such as in any known wired, wireless, or waveguide manner. The steering angle sensor 116 may sense a steering wheel position angle (between a front of the vehicle 100 and a steered wheel 102 direction) and a rate of turn. The steering angle sensor 116 can be analog or digital. The steering angle sensor 116 is powered via the power source and is coupled to the chassis.

Figure 2:
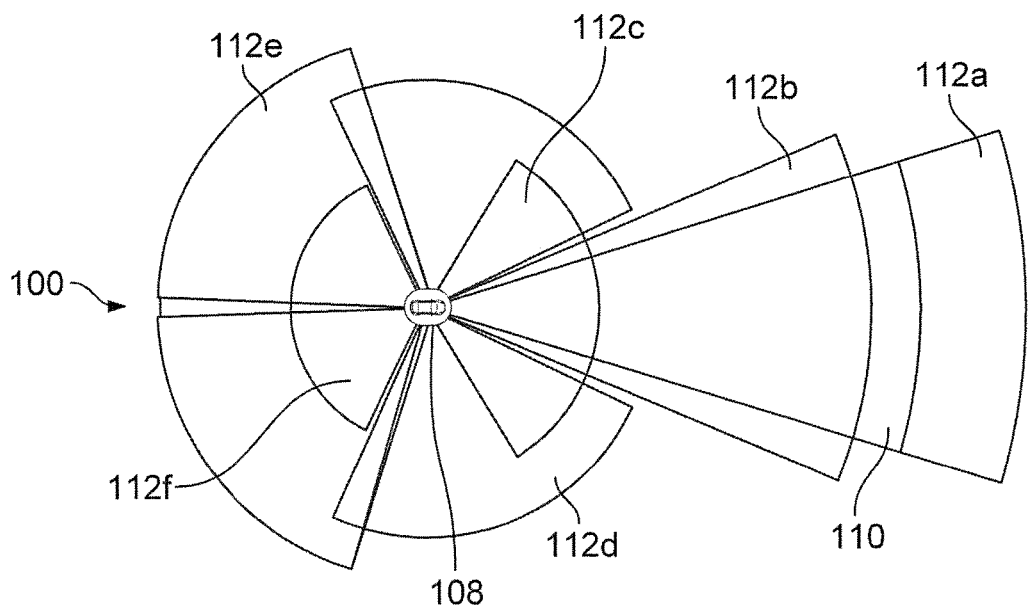
FIG. 2 shows a schematic diagram of an exemplary embodiment of a vehicle equipped with a plurality of devices monitoring a plurality of zones according to this disclosure.

The turn signal source 118, preferably is a turn signal light voltage source and is in communication with the processor 104, such as in any known wired, wireless, or waveguide manner. The turn signal source 118, which is also known as a direction indicator/signal or a blinker, includes a bulb in a lamp mounted near a left and right front and rear corners of the vehicle 100, such as at the chassis, including on lateral sides/side mirrors/fenders/tail of the vehicle 100, that is activated in order to notify others in proximity, whether pedestrians or vehicles, that the vehicle 100 may turn or change lanes toward that respective side. The turn signal source 118 can be manually activated by a driver of the vehicle or can be automatically activated, as disclosed herein. The turn signal source 118 preferably generates a voltage source suitable for the bulb, which can be a light emitting diode (LED) bulb, a fluorescent bulb, an incandescent bulb, a halogen bulb, or any other bulb type held in a turn signal lamp. The turn signal lamp can emit light in any color, such as red, yellow, white, orange, or green, although the turn signal lamp may be covered by a colored transparent/translucent pane, such as plastic or glass, to vary color, as needed, such as when the bulb emits white or yellow light. The turn signal light can be fixed in color/illumination intensity/repetition frequency (flashing) or vary in color/illumination intensity/repetition frequency (flashing), such as based on various factors, as known to skilled artisans. For example, the turn signal light can preferably blink on and off at a rate of from about 60 blinks per minute to about 120 blinks per minute. Note that opposing blinkers, whether on same side or opposing side of the vehicle, can blink at different rates. The turn signal source 118 can operate when the vehicle is moving forward or backward. The turn signal source 118 is powered via the power source and is coupled to the chassis. FIG. 2 shows a schematic diagram of an exemplary embodiment of a vehicle equipped with a plurality of devices monitoring a plurality of zones according to this disclosure. The vehicle 100 is equipped with one or more ultrasonic sensors 108, the radar 110, the transceiver 114, the steering angle sensor 116, the turn signal source 118 and a set of cameras 112, including a narrow forward camera 112a, a main forward camera 112b, a wide forward camera 112c, a forward looking side camera 112d, a rearward looking side camera 112e, a rear view camera 112f, and a side repeater camera 112g, each of which is in communication with the processor 104, powered via the power source, and operates based on the instructions stored in the memory 106. These instructions instruct the processor 104 to interface with one or more ultrasonic sensors 108, the radar 110, the transceiver 114, the steering angle sensor 116, the turn signal source 118, the narrow forward camera 112a, the main forward camera 112b, the wide forward camera 112c, the forward looking side camera 112d, the rearward looking side camera 112e, the rear view camera 112f, and the side repeater camera 112g in order to facilitate performance of a method for automated turn signal activation, as disclosed herein. Note that this configuration provides a 360 degree monitoring zone around the vehicle 100. Note also that various maximum distances listed in FIG. 2 are illustrative and can be adjusted higher or lower, based on need, such as via using other devices, device types, or adjusting range, whether manually or automatically, including in real-time. For example, if the vehicle 100 is a Tesla Model S (or any other Tesla model) equipped with Tesla Autopilot (enhanced Autopilot) driver assist functionality and having Hardware 2 component set (November 2016), then such sensors are components of the Hardware 2 component set.

Figure 3A:
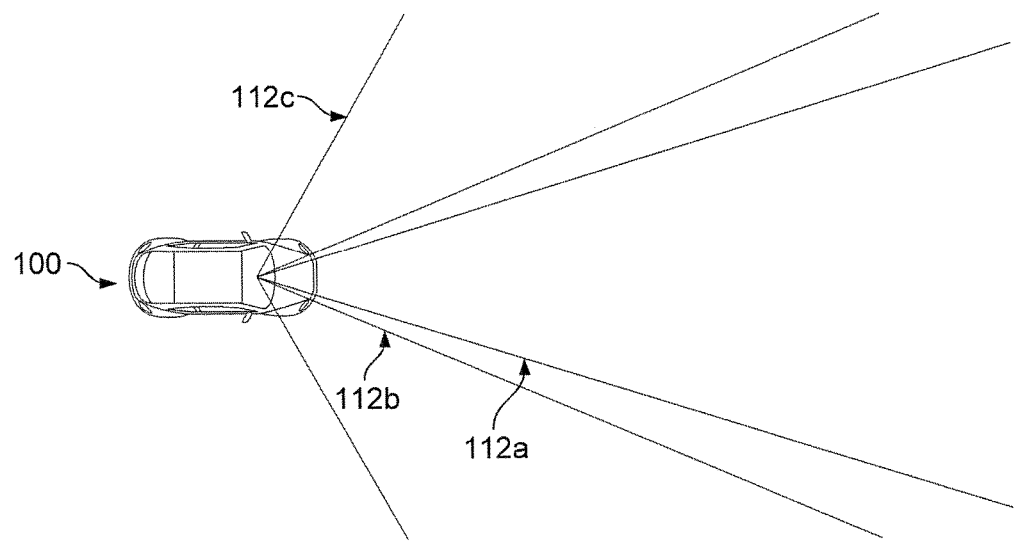
FIGS. 3a, 3b shows a schematic diagram of an exemplary embodiment of a vehicle equipped with a plurality of forward cameras monitoring a plurality of zones and an exemplary embodiment of a forward camera module according to this disclosure.
Figure 3B:
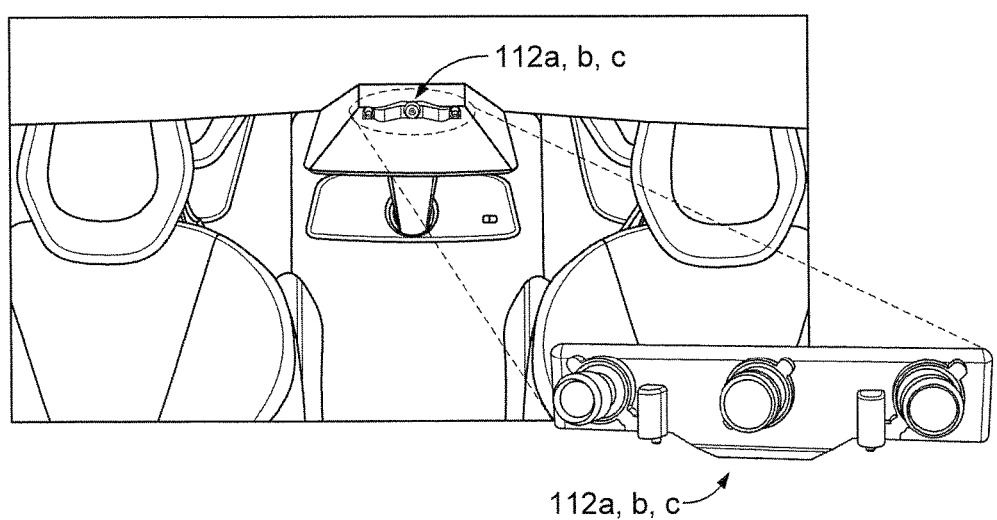

FIGS. 3a, 3b shows a schematic diagram of an exemplary embodiment of a vehicle equipped with a plurality of forward cameras monitoring a plurality of zones and an exemplary embodiment of a forward camera module according to this disclosureexemplary embodiment. As shown in FIG. 3a, the narrow forward camera 112a, the main forward camera 112b, and the wide forward camera 112c capture various frontal fields of view, with the narrow forward camera 112a providing a focused, long range view of distant features, which is useful in high-speed operation. The narrow forward camera 112a, the main forward camera 112b, and the wide forward camera 112c are mounted behind a windshield of the vehicle 100 in order to provide broad visibility in front of the vehicle 100 and focused long-range detection of distant objects. In some embodiments, the narrow forward camera 112a, the main forward camera 112b, or the wide forward camera 112c are mounted in other locations, including on top of the windshield (any portion thereof) or by frontal lights or frontal fender, including bumper, or underside or on roof (any portion thereof) of the vehicle 100.

The main forward camera 112b provides a field of view wider than the narrow forward camera 112a, but narrower than the wide forward camera 112c. The main forward camera 112b covers a broad spectrum of use cases for computer and machine vision when the vehicle 100 is standing still or moving. The wide forward camera 112c provides a field of view wider than the main forward camera 112b. The wide forward camera 112c can include a 120 degree fisheye lens to capture a traffic light, an obstacle cutting into a path of travel of the vehicle 100 or at close range, whether when the vehicle is standing still or moving. The wide forward camera 112c can be useful in urban, low speed maneuvering of the vehicle 100.

Figure 4A:
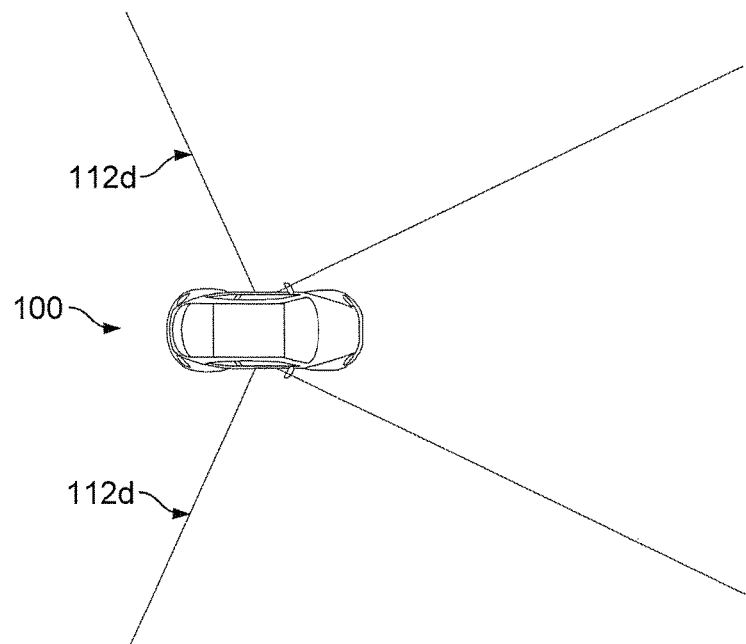
FIGS. 4a, 4b show a schematic diagram of an exemplary embodiment of a vehicle equipped with a plurality of side cameras monitoring a plurality of zones and an exemplary embodiment of a side repeater camera according to this disclosure.
Figure 4B:
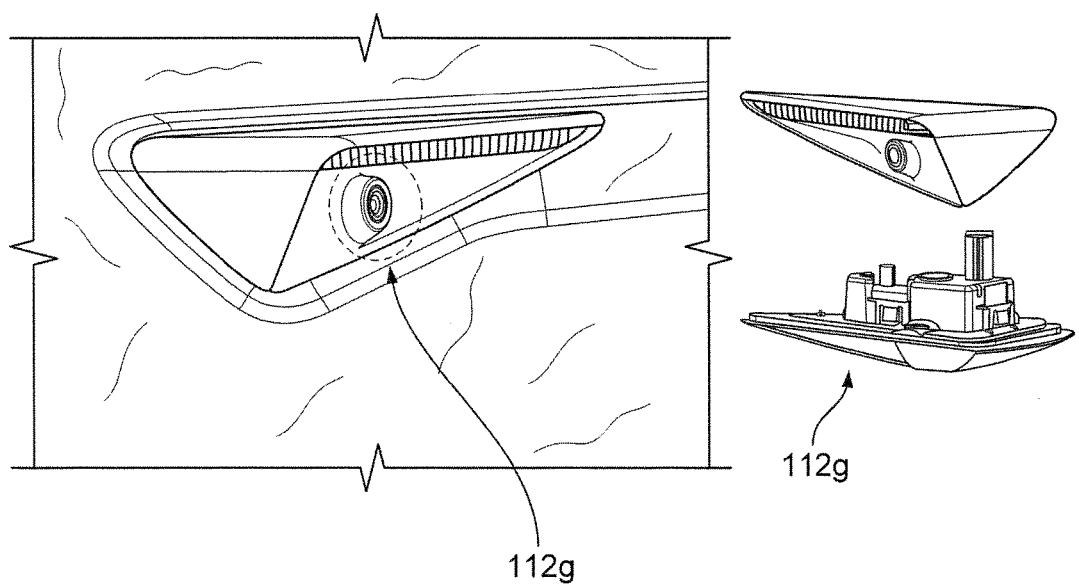

As shown in FIG. 3b, a frontal camera module of the vehicle 100 hosts the cameras 112a, b, c, in proximity of a frontal windshield of the vehicle 100. Although the frontal camera module is shown above a frontal mirror, the frontal camera module can be positioned below or lateral to the mirror or on a frontal dashboard or external a cabin of the vehicle 100, such as via being positioned on a hood or a roof or a pillar of the vehicle. Note that although the frontal camera module is depicted as an elongated and fastenable camera module, the frontal camera module can be embodied in other configurations FIGS. 4a, 4b show a schematic diagram of an exemplary embodiment of a vehicle equipped with a plurality of side cameras monitoring a plurality of zones and an exemplary embodiment of a side repeater camera according to this disclosure. exemplary embodiment. As shown in FIG. 4a, the forward looking side camera 112d can provide a redundancy/backup functionality via looking for vehicles/objects that can unexpectedly enter a lane in which the vehicle 100 is traveling and provide additional safety when entering an intersection with limited visibility. When the vehicle 100 includes a B-pillar, then the vehicle 100 may host the forward looking side camera 112d in the B-pillar.

As shown in FIG. 4b, the side repeater camera 112g is installed into a panel of the vehicle 100, such as over a wheel well. The side repeater camera 112g can provide a set of image data, such as a data feed, to the processor 102, where the set of image data can include a forward camera view, a lateral camera view, or a rearward camera view, which can help in object recognition, such as nearby vehicles or pedestrians. Also, FIG. 4b, shows the side repeater camera 112g prior to installation into the vehicle 100. Note that although the camera 112g is depicted as an elongated and fastenable camera module, the camera 112g can be embodied in other configurations.

Figure 5A:
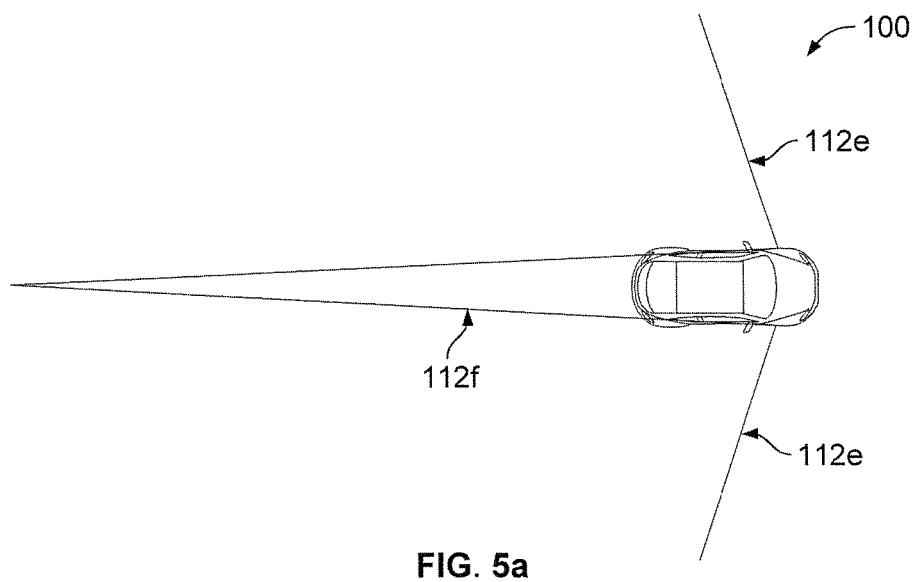
FIGS. 5a, 5b show a schematic diagram of an exemplary embodiment of a vehicle equipped with a plurality of rear cameras monitoring a plurality of zones and an exemplary embodiment of a rear camera module according to this disclosure.
Figure 5B:
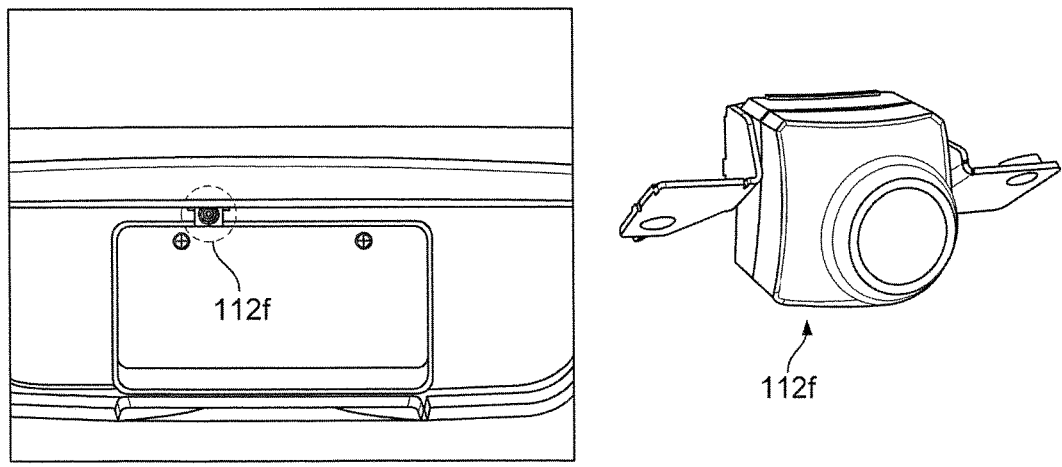

FIGS. 5a, 5b show a schematic diagram of an exemplary embodiment of a vehicle equipped with a plurality of rear cameras monitoring a plurality of zones and an exemplary embodiment of a rear camera module according to this disclosureexemplary embodiment. As shown in FIG. 5a, the rearward looking side camera 112e can be installed near front or rear wheel wells of the vehicle 100 and can monitor rear blind spots on both sides of the vehicle 100, which is important for safely changing lanes and merging into traffic. In some embodiments, the rearward looking side camera 112e is installed in the B-pillar of the vehicle. In some embodiments, the rear view camera 112f can aid in monitoring the rear blind spots.

As shown in FIG. 5b, a module hosting the camera 112f is shown as installed in a trunk of the vehicle 100. However, other locations of installation are possible, such as a bumper of the vehicle 100 or back pillar of the vehicle 100 or a back windshield of the vehicle 100 or a roof of the vehicle 100. Note that although the camera 112f is depicted as a cuboid and fastenable camera module, the camera 112f can be embodied in other configurations.

Figure 6:
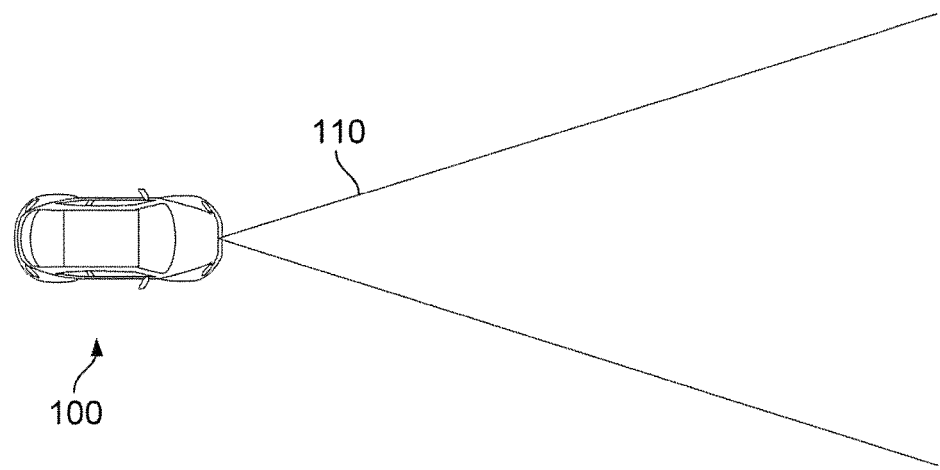
FIG. 6 shows a schematic diagram of an exemplary embodiment of a vehicle equipped with a radar monitoring a zone according to this disclosure.

FIG. 6 shows a schematic diagram of an exemplary embodiment of a vehicle equipped with a radar monitoring a zone according to this disclosure. The radar 110 may be mounted to a front portion of the vehicle, such as on or behind a hood of the vehicle, a grill of the vehicle, the chassis, a fender of the vehicle, an underside of the vehicle or any other portion of the vehicle. The radar 110 preferably employs radio waves with a wavelength that passes through fog, dust, rain, snow, and under other vehicles. The radar 110 communicates with the processor 104 to aid detecting and responding to forward objects, whether pedestrians or vehicles.

Figure 7:
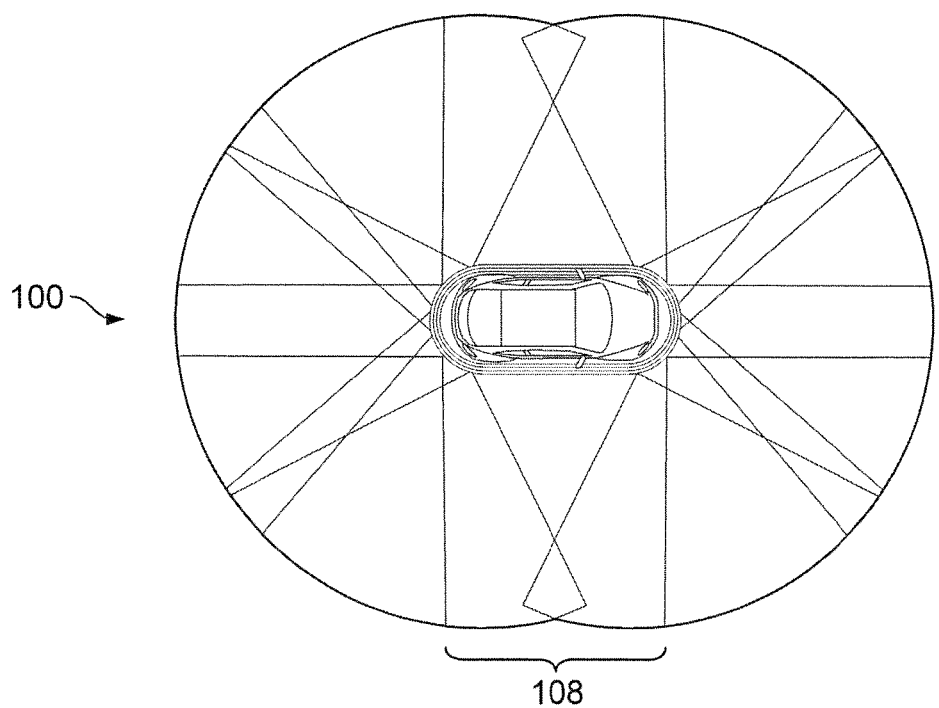
FIG. 7 shows a schematic diagram of an exemplary embodiment of a vehicle equipped with a plurality of ultrasonic sensors monitoring a plurality of zones according to this disclosure.

FIG. 7 shows a schematic diagram of an exemplary embodiment of a vehicle equipped with a plurality of ultrasonic sensors monitoring a plurality of zones according to this disclosure. The ultrasonic sensors 108 can be mounted to any portion of the vehicle 100, such as in order to provide 360 degree coverage. The ultrasonic sensors 108 can effectively double monitoring range with improved sensitivity using ultrasonic waves, which may be based on suitably coded electrical signals. The ultrasonic sensors 108 are useful for detecting nearby vehicles or pedestrians, especially when the vehicles or the pedestrians encroach on a lane on which the vehicle is standing or traveling. The ultrasonic sensors 108 can provide parking guidance to the processor 104, as known to skilled artisans.

Figure 8A:
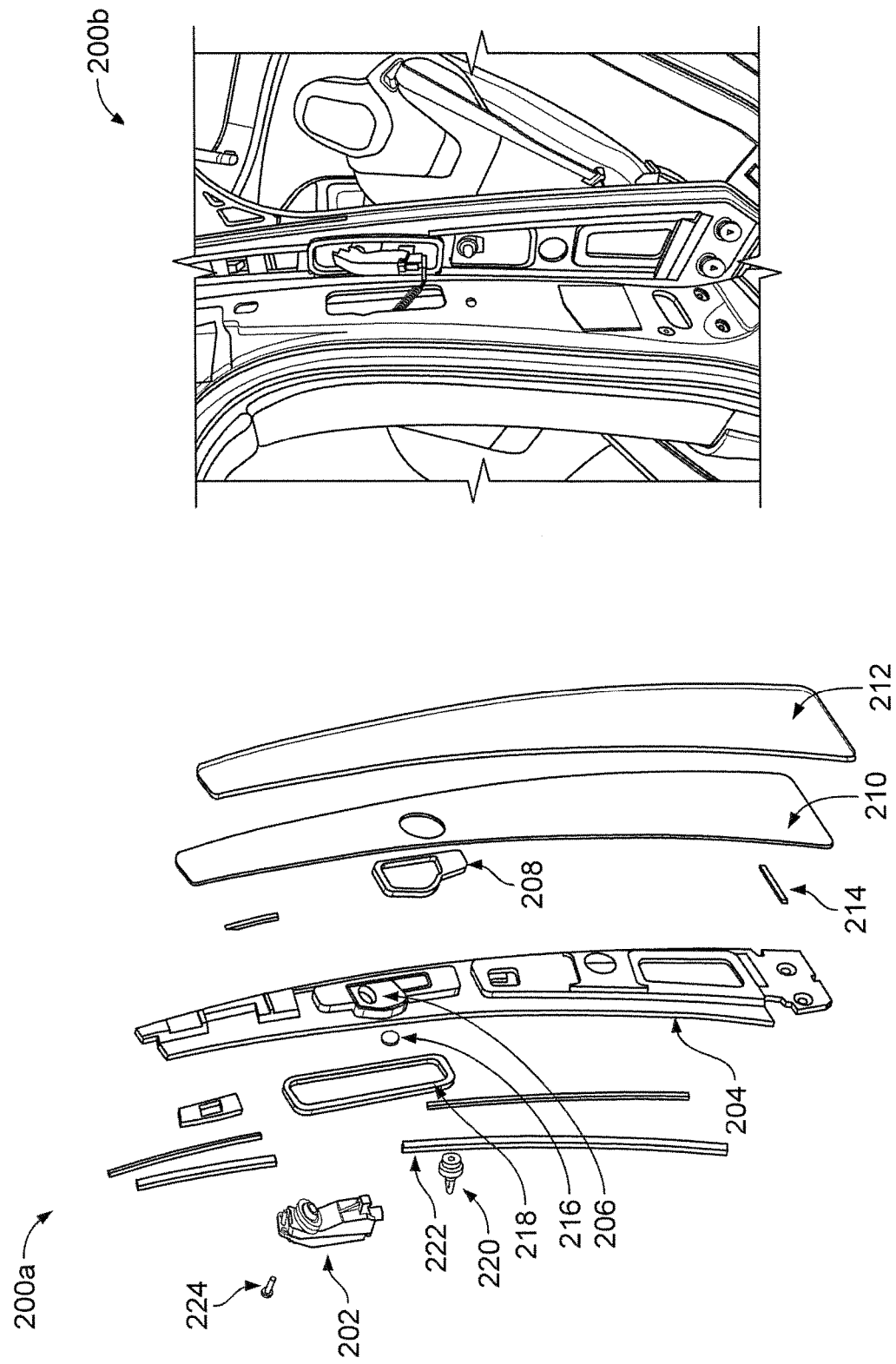
FIGS. 8a, 8b show an exploded view of an exemplary embodiment of a B-pillar of a vehicle, where the B-pillar hosts a camera, an exemplary embodiment of a lateral perspective view of a B-pillar hosting a camera, and an exemplary embodiment of a camera according to this disclosure.
Figure 8B:
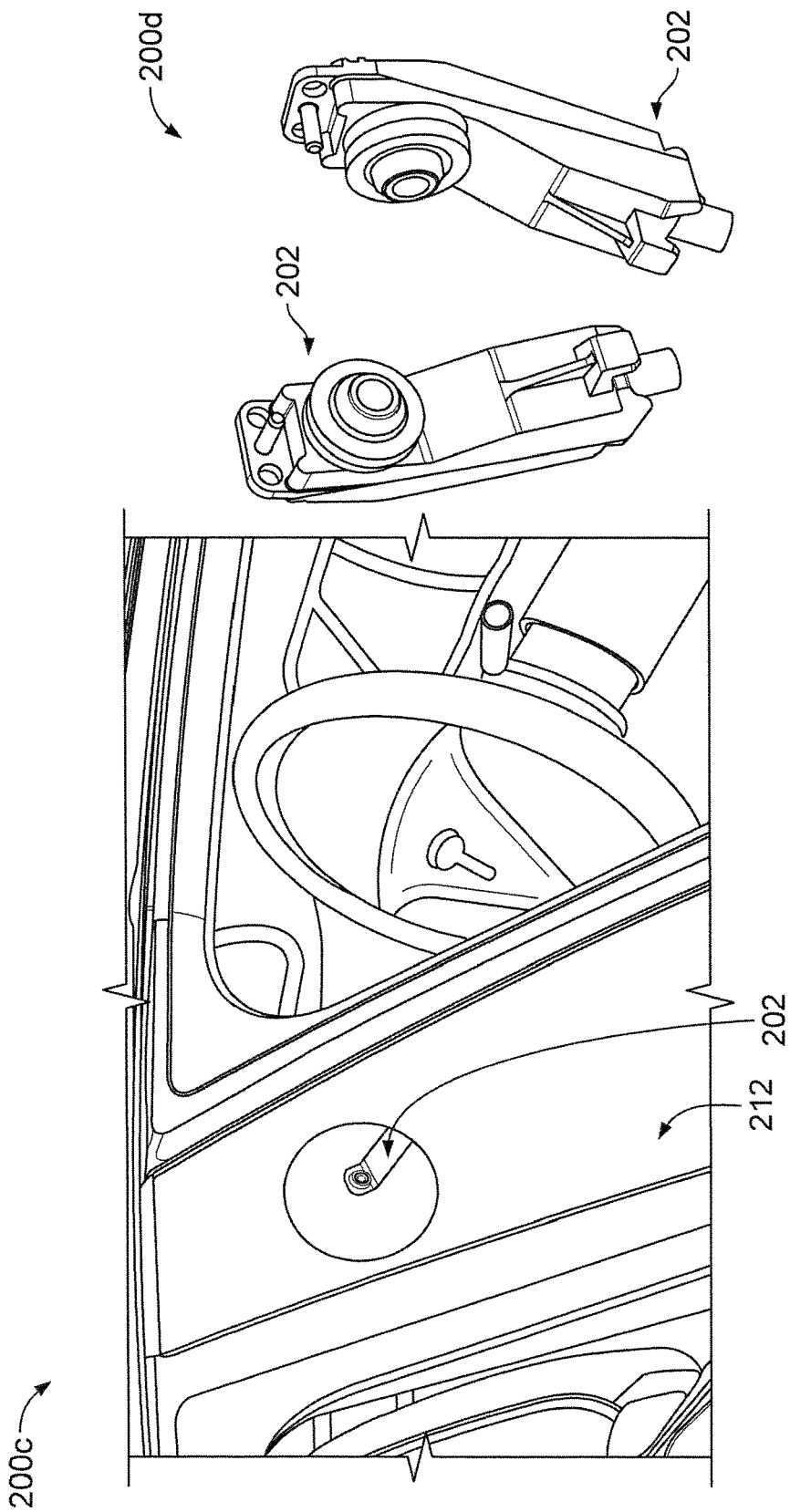
Figure 9A:
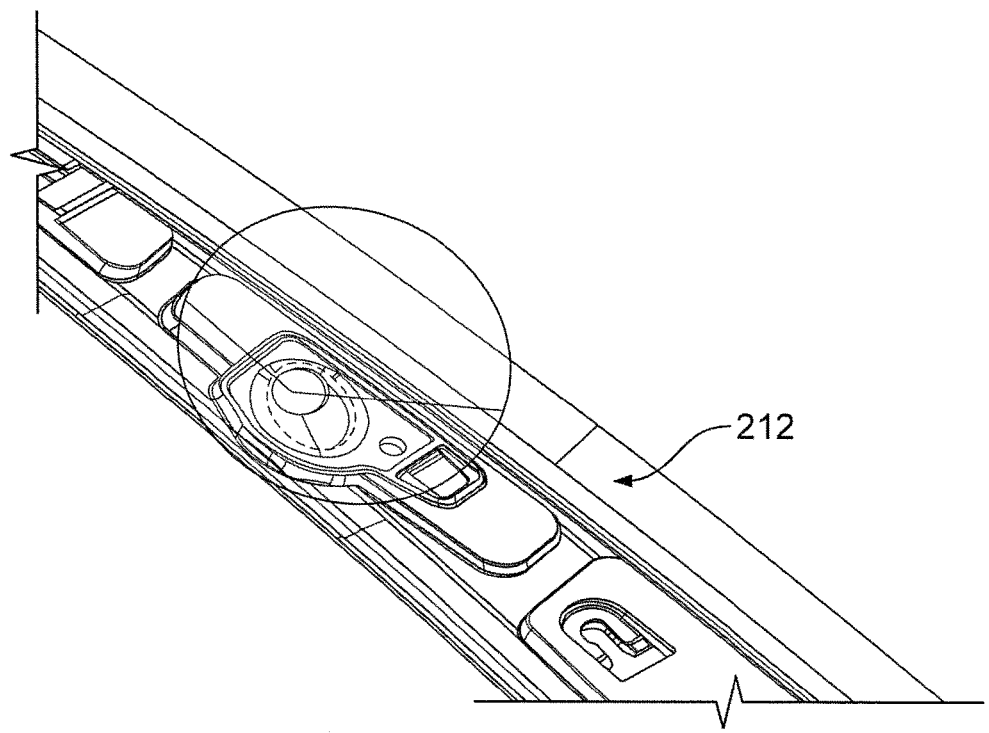
FIGS. 9a-9d show a plurality of schematic diagrams of an exemplary embodiment of a B-pillar of a vehicle, where the B-pillar hosts a camera according to this disclosure.
Figure 9B:
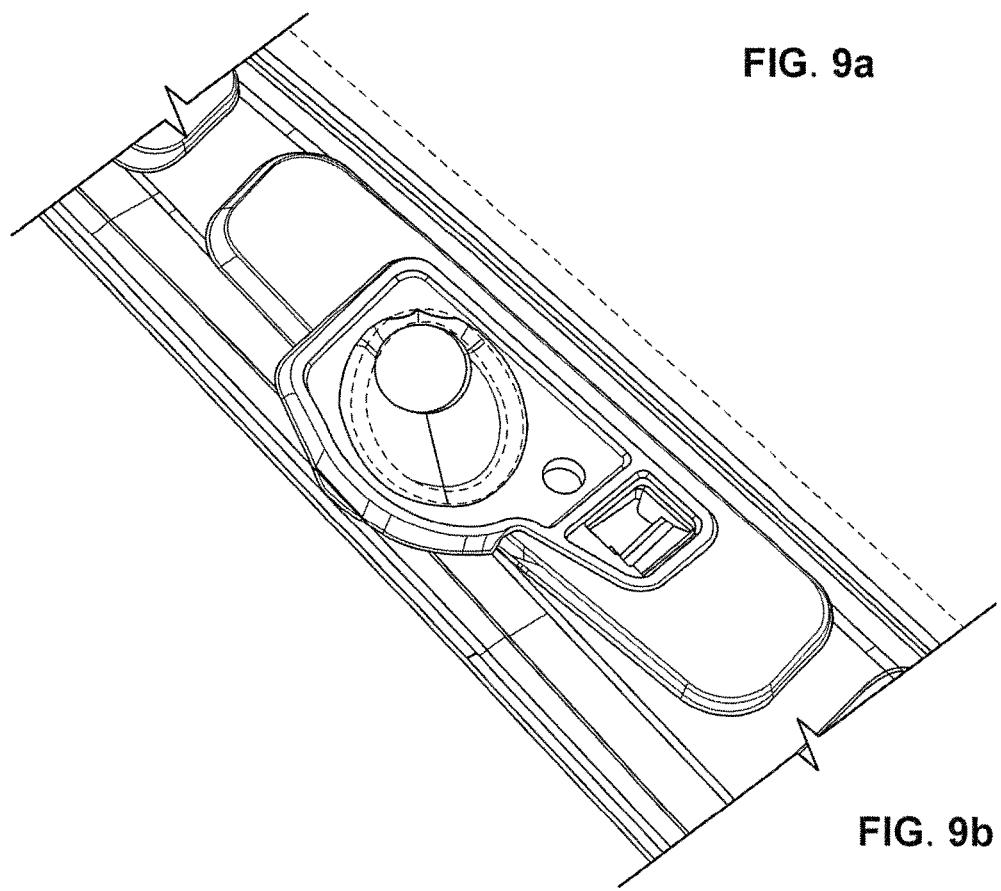
Figure 9C:
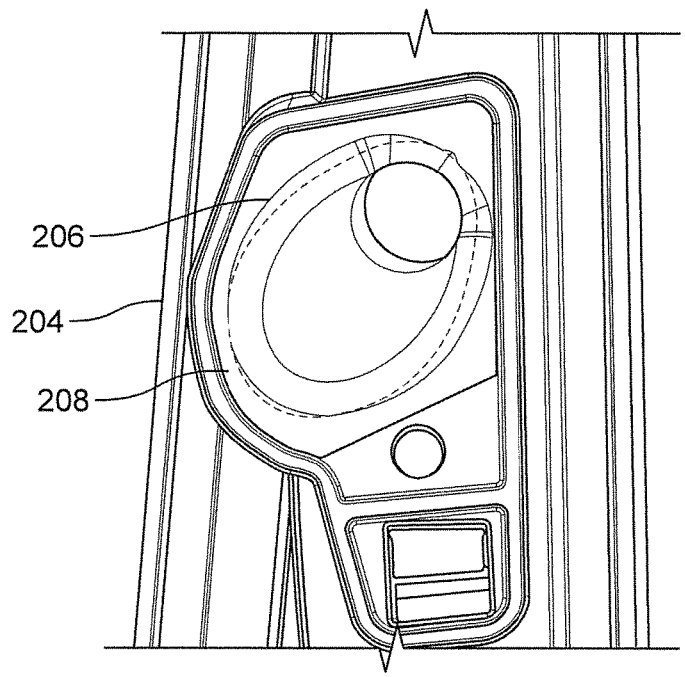
Figure 9D:
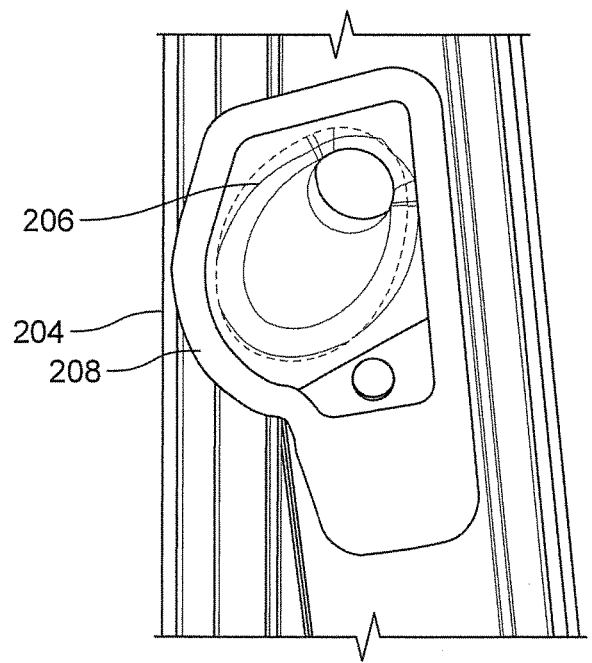

FIGS. 8a, 8b show an exploded view of an exemplary embodiment of a B-pillar of a vehicle, where the B-pillar hosts a camera, an exemplary embodiment of a lateral perspective view of a B-pillar hosting a camera, and an exemplary embodiment of a camera according to this disclosureexemplary embodiment. FIGS. 9a-9d show a plurality of schematic diagrams of an exemplary embodiment of a B-pillar of a vehicle, where the B-pillar hosts a camera according to this disclosure.

As shown in FIG. 8a, the vehicle 100 includes a B-pillar, which is shown as 200a in exploded view and 200b in assembled back view. The B-pillar includes a camera module 202, a composite carrier 204, a flocking 206, a sealing gasket 208, a ceramic frit 210, a tempered glass 212, a pressure sensitive adhesive (PSA) tape 214, a vent patch 216, a sealing foam 218, a trim clip 220, a noise-vibration-harshness (NVH) foam 222, and a camera screw 224. The flocking 206 is installed onto a well within the carrier 204. The camera module 202 is secured to the carrier 204 via the screw 224 such that the camera module 204 captures through the flocking 206. The frit 210 is positioned between the glass 212 between the glass 212 and the gasket 208. The gasket 208 is positioned between the frit 210 and the carrier 204. The gasket 208 seals the flocking 206. The PSA tape secures the frit 210 to the carrier 204. The patch 216 coupled to the carrier 204 in proximity of the camera module 202. The foam 218 is coupled to the carrier 204, while enclosing the camera module 202 and the patch 216. The clip 220 is mounted onto the carrier 204. The foam 222 is coupled to the carrier 204, enclosing the clip 222. As shown in FIG. 8b, the glass 212 extends over the camera 202 in the B-pillar 200b in an assembled front view 200c. Further, FIG. 8b shows the camera 202 from a frontal/lateral view 200d. Note that although the camera 202 is depicted as an elongated and fastenable camera module, the camera 202 can be embodied in other configurations. Although FIGS. 9a-9d schematically show various illustrative sizes, any suitable sizes can be used, as known to skilled artisans.

Figure 10:
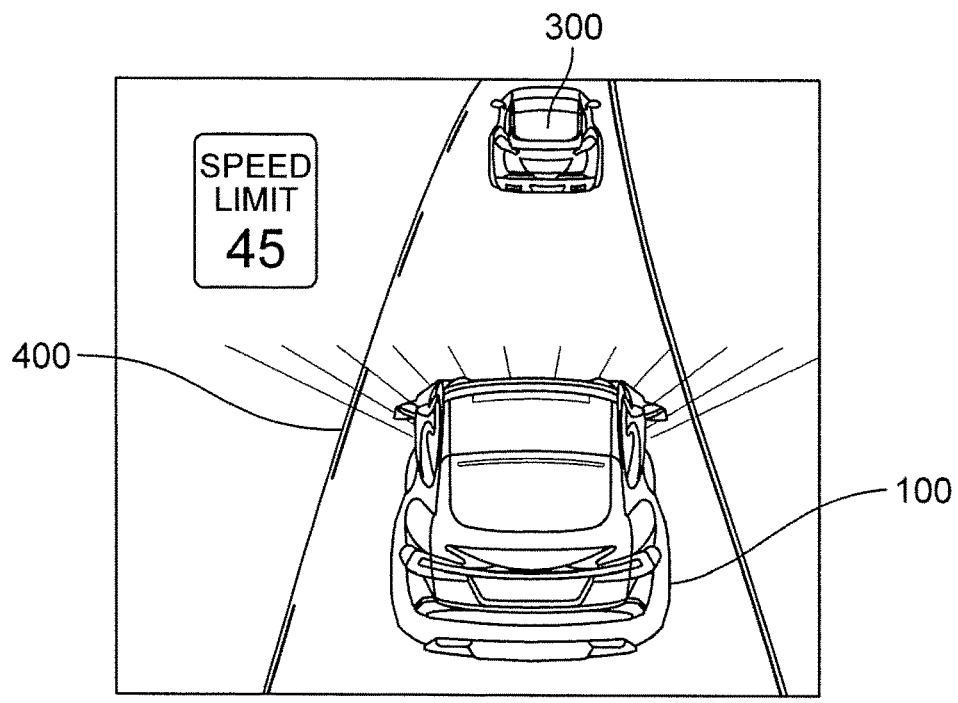
FIG. 10 shows a schematic diagram of an exemplary embodiment of a first vehicle following a second vehicle on a road with a lane line according to this disclosure.

FIG. 10 shows a schematic diagram of an exemplary embodiment of a first vehicle 100 following a second vehicle 300 on a road 400 with a lane line according to this disclosure. The first vehicle 100 and the second vehicle 300 are traveling on the road 400 having a solid lane line on a right side of the vehicle 100 and a broken line on a left side of the vehicle 100. The vehicle 300 is in front of vehicle 100. As such, the vehicle 100 may detect and monitor the vehicle 300, such as via the processor, 104, using one or more ultrasonic sensor 108, the radar 110, and the set of cameras 112, as disclosed herein.

Figure 11:
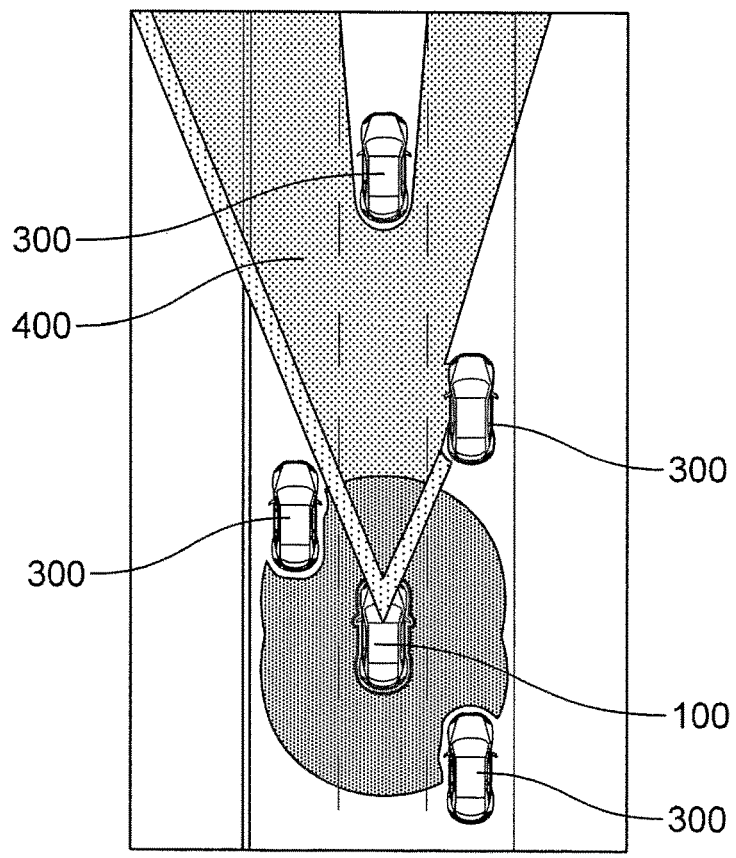
FIG. 11 shows a schematic diagram of an exemplary embodiment of a first vehicle driving on a road with a plurality of second vehicles, where the road includes a plurality of parallel lane lines according to this disclosure.

FIG. 11 shows a schematic diagram of an exemplary embodiment of a first vehicle 100 travelling on a road 402 with a plurality of second vehicles 300, where the road 402 includes a plurality of parallel lanes and lane lines according to this disclosure. The vehicle 100 is traveling on the road 400 and is able to detect and monitor various vehicles 300, whether positioned frontal to the vehicle 100 or rearward of the vehicle 100.

Figure 12:
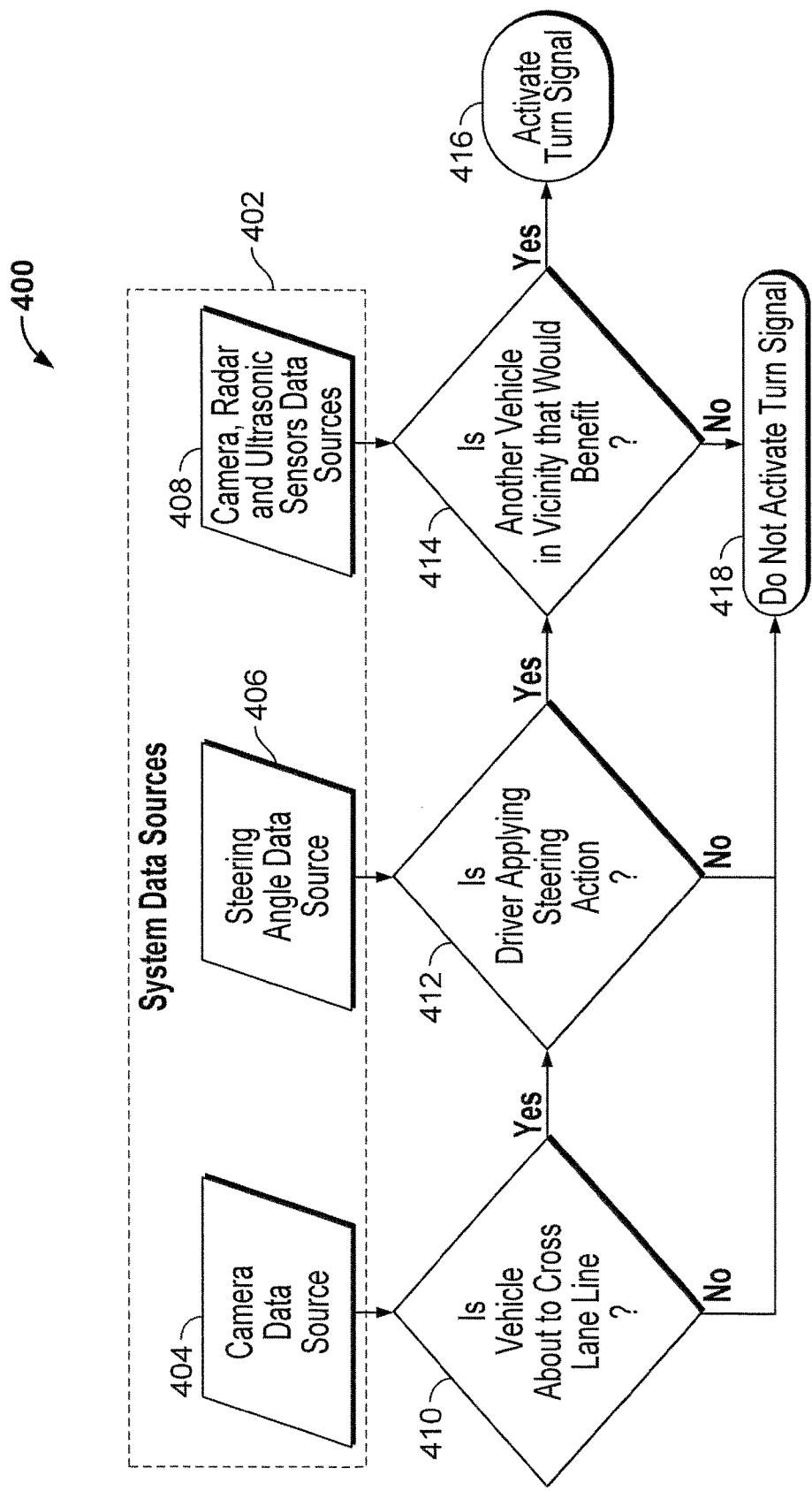
FIG. 12 shows a flowchart of an exemplary embodiment of a first method for automated turn signal activation according to this disclosure.

FIG. 12 shows a flowchart of an exemplary embodiment of a first method for automated turn signal activation according to this disclosure. The vehicle 100 performs a method 400 based on the processor 104 executing the set of instructions stored on the memory 106 and communicably interfacing, whether serially or in parallel, with the ultrasonic sensor(s) 108, the radar 110, the transceiver 114, the steering angle sensor 116, the turn signal source 118 and the set of cameras 112, as disclosed herein. The method 400 includes an input block 402, a plurality of decision blocks 410, 412, 414, and an action blocks 416 and an inaction or action block 418. For example, the method 400 can be performed while the driver actively drives the vehicle 100.

The input block 402 includes a first input 404, a second input 406, and a set of third inputs 408. The first input 404 receives data, such as a data feed or a data stream, from one or more of cameras 112a-f of the set of cameras 112 as a first data source. The second input 406 receives data, such as a data feed or a data stream, from the steering angle sensor 116 as a second data source. The third input 408 receives data, such as a data feed or a data stream, from one or more ultrasonic sensors 108 as a third data source, and data, such as a data feed or a data stream, from the radar 110 as a fourth data source. Each of the first input 404, the second input 406, and the third input 408, including any sub-feeds, are managed via the processor 104 and can receive input data serially or in parallel with each other, whether synchronously or asynchronously with each other, whether in phase or out-of-phase.

In block 410, the processor 104 determines whether the vehicle 100 is about to cross a lane line, such on the road 400, based on the first input 404. For example, based on the data from the set of cameras 112 as a first data source, the processor 104 can perform various algorithms, such as objection recognition/tracking/analytics, and determine if the vehicle 100 is on a trajectory to cross the lane line, such as based on lane lines positioning with respect to the vehicle or based on gaps (change in size, color, frequency, orientation) between the lane lines as is known in the art. If the processor 104 determines that the vehicle 100 is not about to cross the lane line, then the process 400 continues onto block 418, where the processor 104 does not activate the turn signal source 118. Otherwise, if the processor 104 determines that the vehicle 100 is about to cross the lane line, then the process 400 moves onto block 412.

In block 412, the processor 104 determines whether the driver of the vehicle 100 is applying a steering action, based on the second input 406. For example, based on data from the steering angle sensor 116 as a second data source, the processor 104 can determine if the driver is trying to steer the vehicle 100 to turn or switch lanes, such as if a steering angle is within a certain predefined range of values or above/below a certain predefined threshold value stored in the memory 106. If the processor 104 determines that the driver of the vehicle 100 is not applying steering action (vehicle moving forward rectilinearly), then the process 400 continues onto block 418, where the processor 104 does not activate the turn signal source 118. Otherwise, if the processor 104 determines that the driver of the vehicle 100 is applying a corrective action (changing a travel path from rectilinear to diagonal), then the process 400 moves onto block 414.

In block 414, the processor 104 determines if another vehicle, such as the vehicle 300 of FIG. 10 or 11, is present in vicinity of the vehicle 100 based on the third input 408, such as via being within a predetermined distance of the vehicle 100 or within a specific side, position, or orientation of the vehicle 100. For example, such vicinity can be within 20 feet of the first vehicle, within 40 feet of the first vehicle, within 60 feet of the first vehicle, or other distances from the first vehicle. In this case, there is an obvious safety benefit to activating the turn signal source to alert vehicle 300. For example, based on the data from the set of cameras 112 as a first data source, the data from the radar 110 as a third data source, and the data from the ultrasonic sensor 108 as a fourth data source, the processor 104 can determine if the vehicle 300 is present in vicinity of the vehicle 100, such as via image-based objection recognition/tracking/analytics and processing signals from the captured sound/radio waves bouncing off the vehicle 300. This presence in vicinity of the vehicle 100 can be based on various parameters with respect to the vehicle 300, whether statically defined or determined in real-time/on-fly. For example, some of such parameters may be based on or include a set of threshold values or a range of values stored in the memory 106, where this data can reflect a predefined distance, orientation, anticipated travel path, or other movement-based characteristic of the vehicle 300 with respect to the vehicle 100 or vice versa.

If the processor 104 determines that the vehicle 100 is within vicinity of the vehicle 300, such as noted above, then the processor 104 determines whether the turn signal source should be activated so as to improve the safety of vehicle 100 and vehicle 300. Such determination may be based on various parameters with respect to the vehicle 300, whether statically defined or determined in real-time/on-fly. For example, some of such parameters may be based on/include a set of threshold values or a range of values stored in the memory 106, where this data can reflect a set of criteria being applied to a predefined distance, orientation, anticipated travel path, or other movement-based characteristic of the vehicle 300 with respect to the vehicle 100 or vice versa. As such, if the vehicle 300 would benefit from the turn signal source 118 being activated, then the process 400 continues onto the block 416, where the processor 104 activates the turn signal source 118. Otherwise, the processor 104 does not activate the turn signal source 118. Note that in block 416, the processor 104 may activate the turn signal source 118 immediately before the vehicle 100 crosses the lane line, as the vehicle 100 is crossing the lane line, or immediately after the vehicle 100 crossed the lane line. In some embodiments, before, during, or after the processor 104 determines that the turn signal source 118 is/will be activated or not activated, such as for turning or lane switching, then the processor 104 can send a signal informative of this action or inaction, such as via the transceiver 114, to another vehicle, such over a V2V network, such as the vehicle 300. In some embodiments, this signal can be sent to a mobile device, whether handheld or wearable, in proximity of the vehicle 100, such as when operated by a pedestrian to warn or notify, such as visually, vibrationally, or audibly, the pedestrian of the vehicle 100 being in proximity thereof. This signal can be sent over a short range wireless network, such as Bluetooth. In some embodiments, the vehicle 300 can react to this signal, such as via slowing down, changing travel path, turning, forwarding the signal to others, activating a device on the vehicle 300, such as a turn signal source, or other actions or inactions, In one implementation of the process 400, in response to determining, via the processor 104, based on the data from the first data source (e.g., camera), that the vehicle 100 is about to cross the lane line on road 400: the processor 104 determines, based on data from the second data source (e.g., steering angle sensor), that the driver of the vehicle 100 is applying a corrective steering action to the vehicle 100. Likewise, in response to determining, via the processor 104, based on data from the first data source (e.g., camera), the data from the third data source (e.g., radar), and the data from the fourth data source (e.g., ultrasonic sensor(s)), that the vehicle 300 in vicinity of the vehicle 100 would benefit from the turn signal source 118 being activated: the processor 104 activates the turn signal source 118 as the vehicle 100 crosses the lane line in vicinity of the vehicle 300. Note that if the processor 104 identifies a conflict between the information derived from first data source (at least one camera 112) and the information derived from at least one of the second data source (steering angle sensor 116), the third data source (radar 110), or the fourth data source (ultrasonic sensor(s) 108), then the processor 104 may prioritize the first data source over the at least one of the second data source, the third data source, or the fourth data source. Likewise, if the processor 104 identifies a conflict between the third data source (radar 110) and at least one of the first data source (at least one camera 112), the second data source (steering angle sensor 116), or the fourth data source (ultrasonic sensor(s) 108), then the processor 104 may prioritize the third data source over the at least one of the first data source, the second data source, or the fourth data source.

While FIG. 12 and the accompanying description show the analysis of the first, second, third and fourth data sources in a particular order, it should be noted that these data sources can be analyzed in any order and one or more data sources could be analyzed concurrently. Further, in the case that the processor identifies a conflict between the information derived from any of the different data sources, the information derived from any of the data sources may be prioritized over the information derived from any other data source to resolve that conflict.

Figure 13:
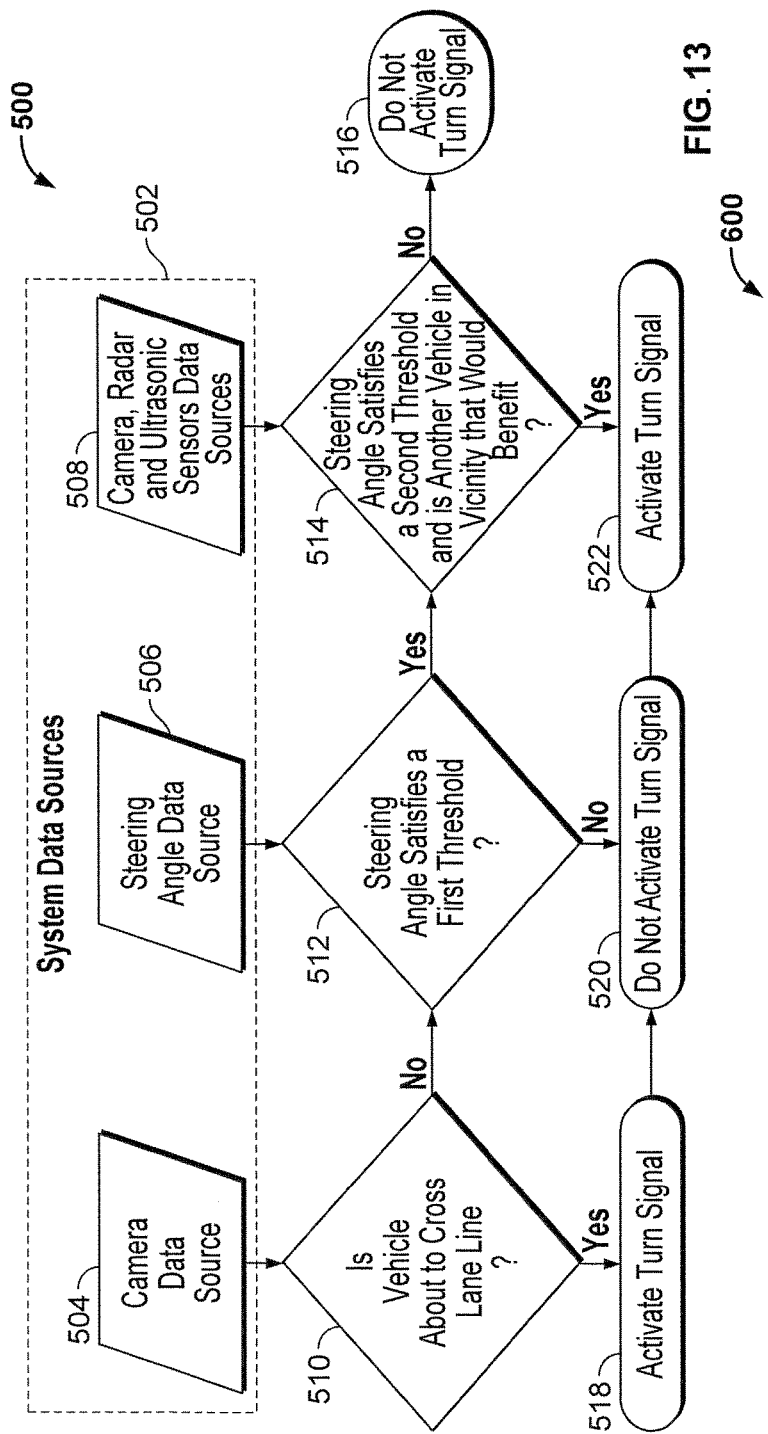
FIG. 13 shows a flowchart of an exemplary embodiment of a second method for automated turn signal activation according to this disclosure.

FIG. 13 shows a flowchart of an exemplary embodiment of a second method for automated turn signal activation according to this disclosure. The vehicle 100 performs a method 500 based on the processor 104 executing the set of instructions stored on the memory 106 and communicably interfacing, whether serially or in parallel, with the ultrasonic sensor 108, the radar 110, the transceiver 114, the steering angle sensor 116, the turn signal source 118, and the set of cameras 112, as disclosed herein. The method 500 includes an input block 502, a plurality of decision blocks 510, 512, 514, and a plurality of action blocks 518, 522, and a plurality of inaction or action blocks 516, 520. For example, the method 500 can be performed while the driver at least semi-actively or passively drives the vehicle 100.

The input block 502 includes a first input 504, a second input 506, and a set of third inputs 508. The first input 504 receives data, such as a data feed or a data stream, from a first data source, such as one or more of the set of cameras 112a-f. The second input 506 receives data, such as a data feed or a data stream, from a second data source, such as the steering angle sensor 116. The third input 508 receives the data, such as a data feed or a data stream, from a third data source, such as the ultrasonic sensor(s) 108, and data, such as a data feed or a data stream, from a fourth data source, such as the radar 110. Each of the first input 504, the second input 506, and the third input 508, including any sub-feeds, are managed via the processor 104 and can receive input data serially or in parallel with each other, whether synchronously or asynchronously with each other, whether in phase or out-of-phase.

In block 510, the processor 104 determines whether the vehicle 100 is about to cross a lane line, such on the road 400, based on the first input 504. For example, based on data from the first data source including one or more of the set of cameras 112, the processor 104 can perform various algorithms, such as object recognition/tracking/analytics, and determine if the vehicle 100 is on a trajectory to cross the lane line, such as based on lane lines positioning with respect to the vehicle or based on gaps (change in size, color, frequency, orientation) between the lane lines as is known in the art. If the processor 104 determines that the vehicle 100 is about to cross the lane line, then the process 500 continues onto block 518, where the processor 104 activates the turn signal source 118. Otherwise, if the processor 104 determines that the vehicle 100 is not about to cross the lane line, then the process 500 moves onto block 512.

In block 512, the processor 104 determines whether a steering angle value, as received from the second input 506, such as from the steering angle sensor 116, satisfies a first threshold value, such as via being equal to or greater than the first threshold value stored in the memory 106. This would indicate that the vehicle 100 or the driver of the vehicle 100 intends to cross a lane line of the road 400. If the processor 104 determines that the first threshold value is satisfied, such as via the steering angle value being less than the first threshold value (not greater than the first threshold value), then the process 500 continues onto block 520, where the processor 520 does not activate the turn signal source 118. Otherwise, the process 500 continues onto block 514.

In block 514, the processor 104 determines whether the steering angle value satisfies a second threshold value, such as being equal to or less than the second threshold value stored in the memory 106, and whether another vehicle, such as the vehicle 300 of FIG. 10 or 11, in vicinity of the vehicle 100, based on the first input 508, would benefit from the turn signal source 118 being activated. For example, based on the data from the set of cameras 112 as the first data source, the data from the radar 110 as the third data source, and the data from the ultrasonic sensor 108 as the fourth data source, the processor 104 can determine if the vehicle 300 is present in vicinity of the vehicle 100, such as via image-based objection recognition/tracking/analytics and processing signals from the captured sound/radio waves bouncing off the vehicle 300, such as via being within a predetermined distance of the vehicle 100 or within a specific side, position, or orientation of the vehicle 100. This presence in vicinity of the vehicle 100 can be based on various parameters with respect to the vehicle 300, whether statically defined or determined in real-time/on-fly. For example, some of such parameters may be based on or include a set of threshold values or a range of values stored in the memory 106, where this data can reflect a predefined distance, orientation, anticipated travel path, or other movement-based characteristic of the vehicle 300 with respect to the vehicle 100 or vice versa. For example, such vicinity can be within 20 feet of the first vehicle, within 40 feet of the first vehicle, within 60 feet of the first vehicle, or other distances from the first vehicle. If the processor 104 determines that the vehicle 100 is within vicinity of the vehicle 300, such as noted above, then the processor 104 determines whether the turn signal source should be activated so as to improve the safety of vehicle 100 and vehicle 300. Such determination may be based on various parameters with respect to the vehicle 300, whether statically defined or determined in real-time/on-fly. For example, some of such parameters may be based on or include a set of threshold values or a range of values stored in the memory 106, where this data can reflect a set of criteria being applied to a predefined distance, orientation, anticipated travel path, or other movement-based characteristic of the vehicle 300 with respect to the vehicle 100 or vice versa. As such, if the vehicle 300 would not benefit from the turn signal source 118 being activated, then the process 500 continues onto the block 516, where the processor 104 does not activate the turn signal source 118. Otherwise, the process 500 continues onto the block 522, where the processor 104 activates the turn signal source 118. Note that in any or all blocks 516, 518, the processor 104 may activate the turn signal source 118 immediately before the vehicle 100 crosses the lane line, as the vehicle 100 is crossing the lane line, or immediately after the vehicle 100 crossed the lane line.

In one implementation of the process 500, in response to determining, via the processor 104, that the steering angle value is within a value range (inclusively between the first threshold value and the second threshold value) stored in the memory 106: the processor 104 determines that the vehicle 100 will cross a lane line on the road 400 and that the vehicle 300 in vicinity of the vehicle 100 would benefit from the turn signal source 118 being activated, the processor 104 activates the turn signal source 118 as the vehicle 100 crosses the lane line in vicinity of the vehicle 300. Note that determining whether the vehicle 300 is in vicinity of the vehicle 100 and would benefit from the turn signal source 118 being activated via the processor 104 is based on receiving data from one or more of camera 112a-f as a first data source, the data from the radar 108 as a third data source, and the data from the ultrasonic sensor 108 as a fourth data source. Note that if the processor 104 identifies a conflict between the data from the first data source (camera 112) and at least one of the data from the third data source (radar 110) or the fourth data source (ultrasonic sensor(s) 108), then the processor 104 prioritizes the data from the first data source over the at least one of the data from the second data source or the data from the fourth data source. Likewise, if the processor 104 identifies a conflict between the data from the third data source (radar 110) and at least one of the data from the first data source (camera 112) or the fourth data source (ultrasonic sensor(s) 108), then the processor 104 prioritizes the third data source over the at least one of the first data source or the fourth data source.

In some embodiments, a storage device, such as the memory 106, having stored therein a set of processor executable instructions which, when executed by an electronic processing system, such as the processor 104, cause the electronic processing system to: determine a path of travel of the first vehicle 100 relative to a lane line based on a first set of data, such as the data from the first data source, received from an image capture device, such as the cameras 112a-f, of the vehicle 100; determine that the vehicle 300 is present within a predetermined distance from the vehicle 100 based on a second set of data, such as the second data source or the third data source, received from a reflective wave detector, such as the radar 110 or the ultrasonic sensor(s) 108; and activate a turn signal source, such as the turn signal source 118, of the vehicle 100 when (a) the vehicle 100 has a travel path and a steering angle such that the vehicle 100 will cross the lane line or turn, and (b) the vehicle 300 is present within the predetermined distance from the vehicle 100.

In some embodiments, the vehicle 100 can be configured for automatically activating the turn signal source 118 when the vehicle 100 is leaving its current lane, about to make a turn onto another roadway/street/lot, during such turn, or immediately after such turn. For example, this functionality can be enabled via the processor 104 determining a geolocation of the vehicle 100, such as via the transceiver 114 communicating with a GPS satellite, and determining if the vehicle 100 is approaching or about to turn onto another roadway/street/lot or being automatically guided to make such turn. If the processor 104 determines that such action is safe, such as via the cameras 112, the radar 110, and the ultrasonic sensor 108 ensuring no vehicles/pedestrians in turning path of the vehicle 100, or if the processor 104 determines that the steering sensor angle value satisfies a threshold indicative of such action about to be made, then the processor 104 can activate the turn signal source 118. This functionality can be augmented via the processor 104 communicating with a street light, such as via the transceiver 114, and activating the turn signal source 118 upon the street light showing green or as the steering angle value satisfies a threshold indicative of such action about to be made in vicinity of the street light. Note that the processor 104 can distinguish between lane switches and turns based on the steering angle value, such as the steering angle value being within different value ranges for the lane switches and for the turns.

As mentioned above, leaving a lane can also include using an off-ramp or lane when exiting an highway, or a merging lane or on-ramp when entering a highway.

While FIG. 13 and the accompanying description show the analysis of the first, second, third and fourth data sources in a particular order, it should be noted that these data sources can be analyzed in any order and one or more data sources could be analyzed concurrently. Further, in the case that the processor identifies a conflict between the information derived from any of the different data sources, the information derived from any of the data sources may be prioritized over the information derived from any other data source to resolve that conflict.

Algorithms for detecting lane changes and turning and the like are well known and incorporated in various driver-assisted and/or autonomous-driving vehicle systems, such as those used in the Tesla Corporation Model S ® (or any other Tesla Corporation model) that incorporates the Tesla Autopilot (enhanced Autopilot) driver assist functionality and has a Hardware 2 component set (November 2016). For example, a lane change can be detected via a machine vision algorithm, performed via the processor 104, which analyzes, in real-time, a set of imagery, from the cameras 112a-c, depicting a set of road markings or a road border of a road on which the vehicle 100 is traveling. Key enhancements in accordance with this disclosure include the autopilot cameras, and perhaps other information, such as, GPS information, to determine vehicle trajectory and whether it will cross lane line without manual signal activation as well as use of the steering angle sensor inputs as well as autopilot proximity sensors such as the ultrasonic sensors and radar feedback to detect the presence or absence of other vehicles that might benefit from receipt of a turn indication in accordance and the algorithms disclosed herein.

Figure 14:
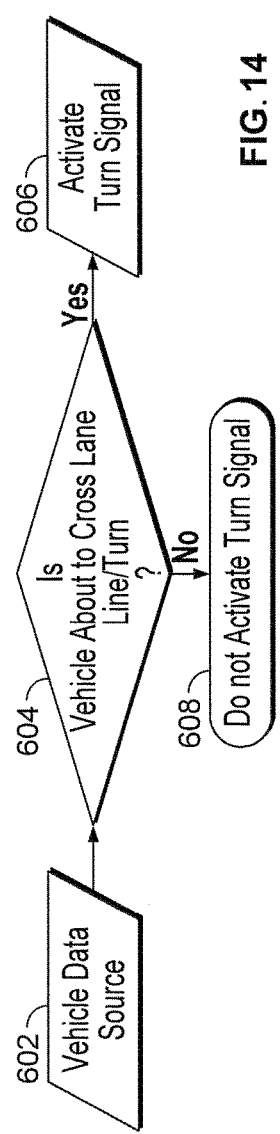
FIG. 14 shows a flowchart of an exemplary embodiment of a third method for automated turn signal activation according to this disclosure.

FIG. 14 shows a flowchart of an exemplary embodiment of a third method for automated turn signal activation according to this disclosure. The vehicle 100 performs a method 600 based on the processor 104 executing the set of instructions stored on the memory 106 and communicably interfacing, whether serially or in parallel, with the ultrasonic sensor(s) 108, the radar 110, the transceiver 114, the steering angle sensor 116, the turn signal source 118, and the set of cameras 112, as disclosed herein. The method 600 includes an input block 602, a decision block 604, an action block 606, and an inaction block 608. For example, the method 600 can be performed while the driver at least semi-actively or passively drives the vehicle 100.

The input block 602 includes an input from one or more data sources, whether local to or remote from the vehicle 100. The data sources can include any data source disclosed herein, such as a camera, a steering angle sensor, a radar, an ultrasonic sensor, a FLIR camera, or others.

In block 604, the processor 104 determines whether the vehicle 100 is about to cross a lane line or effect a turn. This determination can occur via any methodologies disclosed herein. For example, the processor 104 can determine whether the vehicle 100 is about to cross a lane line or effect a turn based on a set of data received from the cameras 112a-c, where the processor 104 performs various algorithms, such as object recognition/tracking/analytics, and determines if the vehicle 100 is on a trajectory to cross the lane line or turn, such as based on lane lines positioning with respect to the vehicle 100 or based on gaps (change in size, color, frequency, orientation) between the lane lines as is known in the art. Likewise, for example, the processor 104 can determine whether the vehicle 100 is about to cross a lane line or effect a turn based on a set of data received from the steering angle sensor 116, where the processor 104 determines whether a steering angle value, as received from the steering angle sensor 116, satisfies a threshold value or is within a predetermined value range, as stored via the memory 106. As such, if the processor 104 determines that the vehicle 100 is about to cross a lane line or effect a turn, then the processor 104 activates the turn signal source 118, as per block 606. Otherwise, the processor 104 does not activate the turn signal source 118, as per block 608.

Computer readable program instructions for carrying out operations of this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of this disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The flowchart and block diagrams in the Figures illustrate the architecture, functionality, and operation of possible implementations of systems, methods, and computer program products according to various embodiments of this disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain exemplary embodiments may be combined and sub-combined in and/or with various other exemplary embodiments. Also, different aspects and/or elements of exemplary embodiments, as disclosed herein, may be combined and sub-combined in a similar manner as well. Further, some exemplary embodiments, whether individually and/or collectively, may be components of a larger system, wherein other procedures may take precedence over and/or otherwise modify their application. Additionally, a number of steps may be required before, after, and/or concurrently with exemplary embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of this disclosure.

The terminology used herein is for describing particular exemplary embodiments and is not intended to be necessarily limiting of this disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A method of automatically activating a turn signal source in a vehicle, the method comprising:
   in response to determining, via a processor, that a first vehicle is not going to turn or leave a lane based on data from a first data source of the first vehicle, sensing and determining, via the processor, whether a steering action is being applied to the first vehicle based on data from a second data source of the first vehicle, the second data source including a steering angle sensor;
   in direct response to the sensing and the determining that the steering action is being applied to the first vehicle, determining, via the processor, whether a second vehicle is sufficiently proximate to the first vehicle based on data from a third data source of the first vehicle and data from a fourth data source of the first vehicle; and
   in response to determining that the second vehicle is sufficiently proximate to the first vehicle, activating, via the processor, a turn signal source of the first vehicle.

2. The method of claim 1, wherein the first data source includes an image capture device.

3. The method of claim 2, wherein the second data source includes a steering angle sensor.

4. The method of claim 3, wherein the third data source includes a radar.

5. The method of claim 4, wherein the fourth data source includes an ultrasonic sensor.

6. The method of claim 1, wherein the first data source includes a side camera.

7. The method of claim 1, further comprising prioritizing an analysis of the data from the first data source over an analysis of the data from at least one of the second data source, the third data source, or the fourth data source in response to identifying, via the processor, a conflict between the analysis of the data from the first data source and the analysis of the data from at least one of the second data source, the third data source, or the fourth data source.

8. The method of claim 7, wherein:
   the first data source includes an image capture device;
   the second data source includes a steering angle sensor;
   the third data source includes a radar; and
   the fourth data source includes an ultrasonic sensor.

9. The method of claim 1, further comprising:
   prioritizing an analysis of the data from the third data source over an analysis of the data from at least one of the first data source, the second data source, or the fourth data source in response to identifying, via the processor, a conflict between the analysis of the data from the first data source and the analysis of the data from at least one of the first data source, the second data source, or the fourth data source.

10. The method of claim 9, wherein:
    the first data source includes an image capture device;
    the second data source includes a steering angle sensor;
    the third data source includes a radar; and
    the fourth data source includes an ultrasonic sensor.

11. A method of automated turn signaling, the method comprising:
    in response to determining, via a processor, that a vehicle is not about to cross a lane line or turn based on a set of data from an image capture device, determining, via the processor, whether a steering angle value from a steering angle sensor of the vehicle satisfies a first threshold value stored in the memory, wherein the vehicle includes the processor, the memory, the image capture device, and a turn signal source;
    in response to determining that the steering angle satisfies the first threshold, determining whether the steering angle satisfies a second threshold stored in the memory using the steering angle sensor and determining whether a second vehicle is sufficiently proximate the first vehicle using data from other, different sensors; and
    in response to determining that the steering angles satisfies the second threshold and that the second vehicle is sufficiently proximate the first vehicle, activating, via the processor, the turn signal.

12. The method of claims 11, wherein the activating includes activating immediately before the first vehicle crosses the lane line or effects the turn.

13. The method of claims 11, wherein the activating includes activating during the first vehicle crossing the lane line or effecting the turn.

14. The method of claims 11, wherein the activating includes activating immediately after the first vehicle crossed the lane line or effects the turn.

15. The method of claims 11, wherein the vehicle is a first vehicle, and further comprising:

determining, via the processor, that a second vehicle is present within a predetermined distance from the first vehicle, wherein the activating is based on the second vehicle being present within the predetermined distance from the first vehicle.

16. A non-transitive storage device having stored therein a set of processor executable instructions which, when executed by an electronic processing system, cause the electronic processing system to:
determine, based on a first set of data received from an image capture device of a first vehicle, that the first vehicle is not going to turn or leave a lane;
in direct response to determining that the first vehicle is not going to turn or leave a lane, sensing a steering angle of the first vehicle using a steering angle sensor and determining whether a steering action is being applied;
in response to determining that the steering action is being applied, determine whether a second vehicle is sufficiently proximate the first vehicle based on a second set of data received from a reflective wave detector;
n response to determining that the second vehicle is sufficiently proximate the first vehicle, activate a turn signal source of the first vehicle.

17. A motor vehicle including
an electronic processing system comprising a processor and a non-transitive storage device;
an image capture device;
a steering angle sensor; and
a turn signal source,
wherein the non-transitive storage device includes processor executable instructions that when executed by the processor cause the electronic processing system to:
in direct response to determining that the vehicle is not going to turn or leave a lane based on a first set of data from the image capture device, sense and determine whether a steering action is being applied based on a second set of data from the steering angle sensor,
in response to determining that the steering action is being applied, determine from a third set of data from a third data source whether a second vehicle is sufficiently proximate the first vehicle, and
in response to determining that the second vehicle is sufficiently proximate the first vehicle, activate the turn signal source.

18. The motor vehicle of claim 17, wherein, when executed by the processor, the processor executable instructions cause the electronic processing system to determine an approximate location of a second vehicle relative to the first vehicle based on data from at least one of the ultrasonic sensor or the radar.

19. The motor vehicle of claim 17, wherein:
the storage device stores a value range,
the steering angle sensor is configured to output a steering angle value when the vehicle is in motion,
to determine that the vehicle will leave a lane line or turn when the steering angle value is within the value range.

20. The motor vehicle of claim 17, wherein:
the memory storage device stores a threshold value for a steering angle,
the steering angle sensor is configured to output a steering angle value when the vehicle is in motion, and
to determine that the vehicle will leave a lane line or turn when the steering angle value is above the threshold value stored in memory.

21. A method comprising:
in response to determining, via a processor, that a first vehicle is going to turn or leave a lane based on data from a first data source of the first vehicle, determining, via the processor, whether a corrective action is not being applied to the first vehicle based on data from a second data source of the first vehicle;
in response to the determining that the corrective action is not being applied to the first vehicle, not activating, via the processor, a turn signal source of the first vehicle.

* * * * *

UNITED STATES PATENT AND TRADEMARK OFFICE
CERTIFICATE OF CORRECTION

PATENT NO. : 10,406,972 B2
APPLICATION NO. : 15/896581
DATED : September 10, 2019
INVENTOR(S) : Sean Haight Page 1 of 1

It is certified that error appears in the above-identified patent and that said Letters Patent is hereby corrected as shown below:

In the Specification

In Column 8, Line 5, delete "disclosureexemplary embodiment." and insert --disclosure.--.

In Column 8, Line 51, after "disclosure." delete "exemplary embodiment.".

In Column 9, Line 8, delete "disclosureexemplary embodiment." and insert --disclosure.--.

In Column 9, Lines 55-56, delete "disclosureexemplary embodiment." and insert --disclosure.--.

In Column 12, Line 34, delete "inactions," and insert --inactions.--.

In the Claims

In Column 20, Line 57, Claim 12, delete "claims" and insert --claim--.

In Column 20, Line 60, Claim 13, delete "claims" and insert --claim--.

In Column 20, Line 63, Claim 14, delete "claims" and insert --claim--.

In Column 20, Line 66, Claim 15, delete "claims" and insert --claim--.

In Column 21, Line 22, Claim 16, delete "n" and insert --in--.

Signed and Sealed this
Twenty-fourth Day of March, 2020

Andrei Iancu
*Director of the United States Patent and Trademark Office*